US012249828B2

(12) United States Patent
Kikuchi et al.

(10) Patent No.: US 12,249,828 B2
(45) Date of Patent: Mar. 11, 2025

(54) POWER CONVERSION DEVICE

(71) Applicant: Hitachi, Ltd., Tokyo (JP)

(72) Inventors: Akira Kikuchi, Tokyo (JP); Akihiko Kanouda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 18/021,644

(22) PCT Filed: May 7, 2021

(86) PCT No.: PCT/JP2021/017476
§ 371 (c)(1),
(2) Date: Feb. 16, 2023

(87) PCT Pub. No.: WO2022/044431
PCT Pub. Date: Mar. 3, 2022

(65) Prior Publication Data
US 2024/0039414 A1 Feb. 1, 2024

(30) Foreign Application Priority Data
Aug. 24, 2020 (JP) .................................. 2020-140731

(51) Int. Cl.
*H02J 1/10* (2006.01)
*B60L 53/67* (2019.01)
(Continued)

(52) U.S. Cl.
CPC .............. *H02J 1/106* (2020.01); *B60L 53/67* (2019.02); *H02J 1/102* (2013.01); *H02M 1/0074* (2021.05);
(Continued)

(58) Field of Classification Search
CPC .... H02M 1/007; H02M 1/0074; H02M 1/008; H02M 3/33573; H02M 3/33576;
(Continued)

(56) References Cited

U.S. PATENT DOCUMENTS 9,590,483 B1   3/2017 Basic
2015/0070939 A1*  3/2015 Gupta .................... H02M 7/10
                                                        363/17

(Continued)

FOREIGN PATENT DOCUMENTS

JP      10-271823 A    10/1998
JP      11-113256 A     4/1999
(Continued)

OTHER PUBLICATIONS

International Search Report (PCT/ISA/210) issued in PCT Application No. PCT/JP2021/017476 dated Jul. 13, 2021 with English translation (five (5) pages).
(Continued)

*Primary Examiner* — Fred E Finch, III
(74) *Attorney, Agent, or Firm* — Crowell & Moring LLP

(57) ABSTRACT

Provided is a power conversion device that can be realized with a small circuit and is capable of stably converting AC power inputted from a three-phase power source system into DC power. In a power conversion device: an output terminal of a common converter cell in a J-numbered stage is connected, together with output terminals of common converter cells of the other two phases, to common lines; an output terminal of an independent converter cell in a K-numbered stage is connected to independent lines independently of converter cells of the other two phases; and a plurality of switches comprise a common switch for switching the connection relationship between the common lines and DC buses, and an independent switch for switching the connection relationship between the independent lines and DC buses.

8 Claims, 8 Drawing Sheets

(51) Int. Cl.
  *H02M 1/00* (2007.01)
  *H02M 3/335* (2006.01)
(52) U.S. Cl.
  CPC .... *H02M 3/33573* (2021.05); *H02M 3/33576* (2013.01)
(58) Field of Classification Search
  CPC .... H02M 3/33584; H02M 7/219; H02J 1/102; H02J 1/106; B60L 53/11; B60L 53/63; B60L 53/67; B60L 2210/10; B60L 2210/30
  See application file for complete search history.

(56) References Cited

U.S. PATENT DOCUMENTS

| | | | |
|---|---|---|---|
| 2015/0349387 A1 | 12/2015 | Inaba et al. | |
| 2018/0162229 A1* | 6/2018 | Götz | H02J 7/0042 |
| 2018/0262117 A1* | 9/2018 | Lu | H02M 3/33571 |
| 2019/0372465 A1* | 12/2019 | Xu | H02M 3/33573 |
| 2020/0006970 A1* | 1/2020 | Chen | H02M 7/217 |
| 2020/0014310 A1 | 1/2020 | Helling et al. | |
| 2020/0220355 A1* | 7/2020 | Xie | H02J 3/381 |
| 2021/0013812 A1* | 1/2021 | Huang | H02M 7/483 |
| 2021/0044208 A1* | 2/2021 | Li | H02M 3/33584 |
| 2021/0129701 A1* | 5/2021 | Brombach | H02J 7/00 |

FOREIGN PATENT DOCUMENTS

| | | |
|---|---|---|
| JP | 2012-70479 A | 4/2012 |
| JP | 2019-213424 A | 12/2019 |
| WO | WO 2014/132321 A1 | 9/2014 |

OTHER PUBLICATIONS

Japanese-language Written Opinion (PCT/ISA/237) issued in PCT Application No. PCT/JP2021/017476 dated Jul. 13, 2021 (three (3) pages).

Extended European Search Report issued in European Application No. 21860863.6 dated Jul. 26, 2024 (11 pages).

\* cited by examiner

POWER CONVERSION DEVICE

TECHNICAL FIELD

The present invention relates to a power conversion device.

BACKGROUND ART

As power sources and electric vehicles (EV) using renewable energy become widespread, a need for energy management in running these devices has been increasing. As a result, a power conversion device capable of flexibly controlling the power flow of these devices is now in demand. An example of such a power conversion device is described in the paragraph 0013 of the specification of PTL 1: "As shown in FIG. 1, a charging device charges a storage battery incorporated in on an electric vehicle with power supplied from an AC or DC power supply system 23 via a power conversion circuit. The power conversion circuit includes converter cells 20-1 to 20-M (M: natural number) that convert supplied power into DC power for charging, a switch 21, repeaters 30-1 to 30-M, and charging connectors 31-1 to 31-M. Power conversion operations of the converter cells 20-1 to 20-M and a switching operation of the switch 21 are controlled by a central controller 22.".

CITATION LIST

Patent Literature

PTL 1: JP 2019-213424 A

SUMMARY OF INVENTION

Technical Problem

As indicated above, PTL 1 refers to "an AC or DC power supply system 23", but does not refer to a fact that a three-phase power source system is used as the power supply system 23. Besides, in a configuration in which the converter cells are connected in series, when the loads of the converter cells connected in series become unbalanced, it becomes difficult to stably control respective output voltages of the converter cells. Preventing such a situation requires numbers of switches for switching the connection relationship between the converter cells and a plurality of load devices (e.g., electric vehicles), which poses a problem that the configuration of the power conversion device becomes complicated.

The present invention has been conceived in view of the above circumstances, and it is therefore an object of the present invention to provide a power conversion device that can stably convert AC power supplied from a three-phase power source system, into DC power and that can be constructed by using a small-scale circuit.

Solution to Problem

In order to solve the above problem, a power conversion device of the present invention includes: three input lines to which a three-phase voltage is inputted; 3×N converter cells having their respective input terminals connected in series or in parallel between each of the input lines and a neutral line; M lines of DC bus; and a plurality of switches that set a state of connection between each of output terminals of the 3×N converter cells and each of the M lines of DC buses. The output terminals of common converter cells that are the converter cells of a number of stages J (where N>J) connected between each of the input lines and the neutral line are connected to a common line as the output terminals of the other common converter cells of two phases are connected to the common line as well. The output terminals of independent converter cells that are the converter cells of a number of stages K (where K=N−J) connected between each of the input lines and the neutral line are connected to an independent line independent of the other independent converter cells of two-phase. The plurality of switches includes a common switch that switches a connection relationship between each of the common lines and each of the DC buses, and an independent switch that switches a connection relationship between each of the independent lines and each of the DC buses.

Advantageous Effects of Invention

According to the present invention, AC power supplied from a three-phase power source system can be stably converted into DC power, and a power conversion device can be constructed by using a small-scale circuit.

DESCRIPTION OF EMBODIMENTS

First Embodiment

Figure 1:
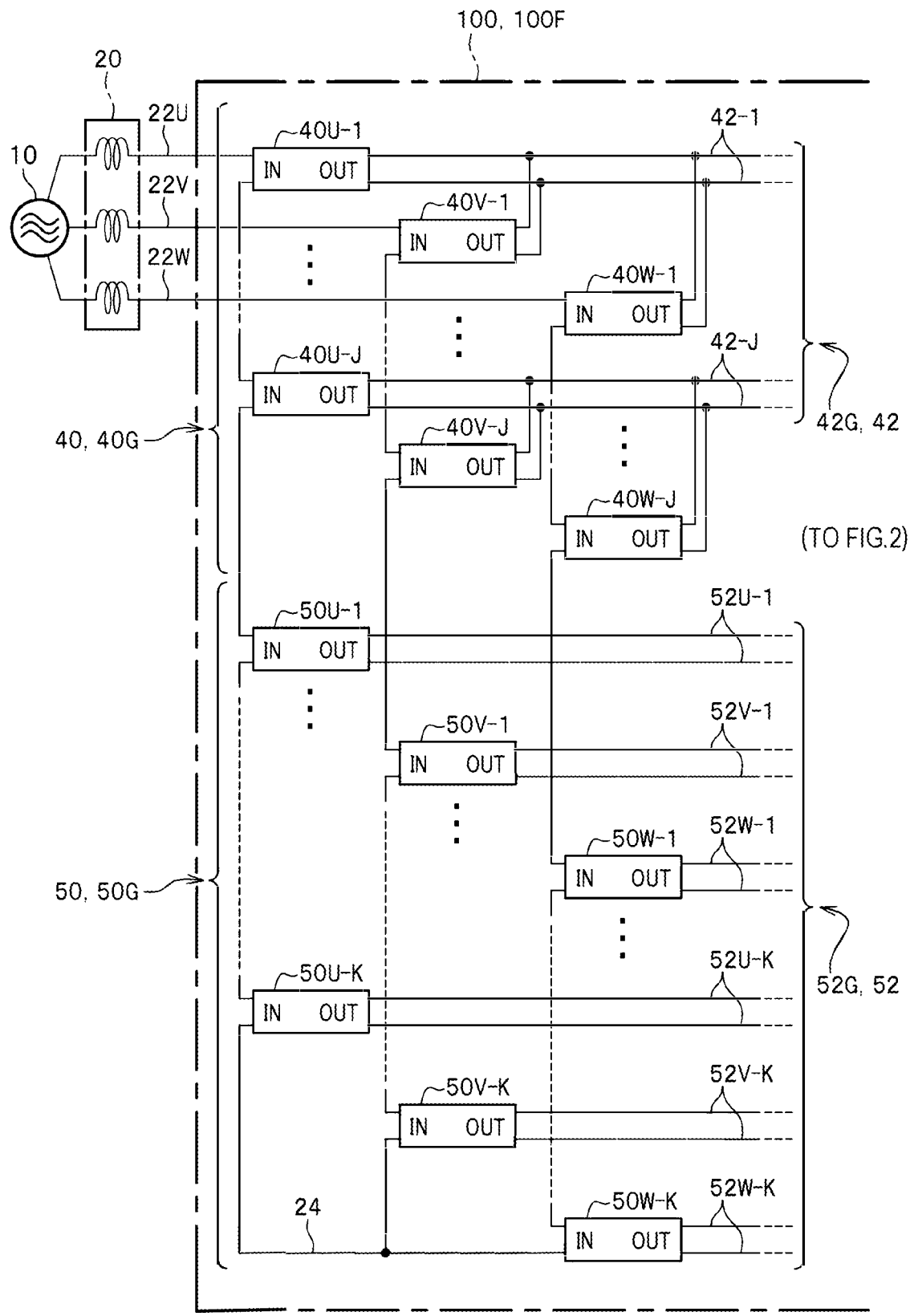
FIG. 1 is a block diagram of a front stage section of a power conversion device according to a preferred first embodiment.

<Configuration of First Embodiment>
FIG. 1 is a block diagram of a front stage section 100F of a power conversion device 100 according to a preferred first embodiment.

In FIG. 1, the power conversion device 100 is connected to a three-phase power source system 10 via a three-phase AC reactor 20 and input lines 22U, 22V, and 22W of U-phase, V-phase, and W-phase. The power conversion device 100 has a neutral line 24 disposed therein, and between the input line 22U and the neutral line 24, input terminals IN of converter cells 40U-1 to 40U-J of J stages and input terminals IN of converter cells 50U-1 to 50U-K of K stages are sequentially connected in series. J and K each denote a natural number.

Likewise, between the input line 22V and the neutral line 24, input terminals IN of converter cells 40V-1 to 40V-J of J stages and input terminals IN of converter cells 50V-1 to 50V-K of K stages are sequentially connected in series. Likewise, between the input line 22W and the neutral line 24, input terminals IN of converter cells 40W-1 to 40W-J of J stages and input terminals IN of converter cells 50W-1 to 50W-K of K stages are sequentially connected in series. Each converter cell outputs a DC voltage from its output terminal OUT when an AC voltage is applied to the input terminal IN.

The converter cells 40U-1 to 40U-J, 40V-1 to 40V-J, and 40W-1 to 40W-J may be collectively referred to as a "converter cell group 40G", and each converter cell of the converter cell group 40G may be referred to as a "converter cell 40 (common converter cell)". Likewise, the converter cells 50U-1 to 50U-K, 50V-1 to 50V-K, and 50W-1 to 50W-K may be collectively referred to as a "converter cell group 50G", and each converter cell of the converter cell group 50G may be referred to as a "converter cell 50 (independent converter cell)". In addition, the number of stages per phase of the converter cell group 40G is referred to as "the common-cell number of stages J", the number of stages per phase of the converter cell group 50G is referred to as "the independent-cell number of stages K", and the sum of both numbers of stages (J+K) is referred to as "the total number of stages N".

Output terminals OUT of converter cells 40U-p, 40V-p, and 40W-p (where 1≤p≤J) are connected in parallel and are connected to a common line 42-p, which is a pair of positive and negative lines. In other words, the power conversion device 100 includes common lines 42-1 to 42-J. These common lines 42-1 to 42-J may be collectively referred to as a "common line group 42G", and each common line may be referred to as a "common line 42".

Output terminals OUT of converter cells 50U-q, 50V-q, and 50W-q (where 1≤q≤K) are connected respectively to independent lines 52U-q, 52V-q, and 52V-q, each of which is a pair of positive and negative lines. In other words, the power conversion device 100 includes independent lines 52U-1 to 52U-K, 52V-1 to 52V-K, and 52W-1 to 52W-K. These independent lines may be collectively referred to as an "independent line group 52G", and each independent line may be referred to as an "independent line 52".

Figure 2:
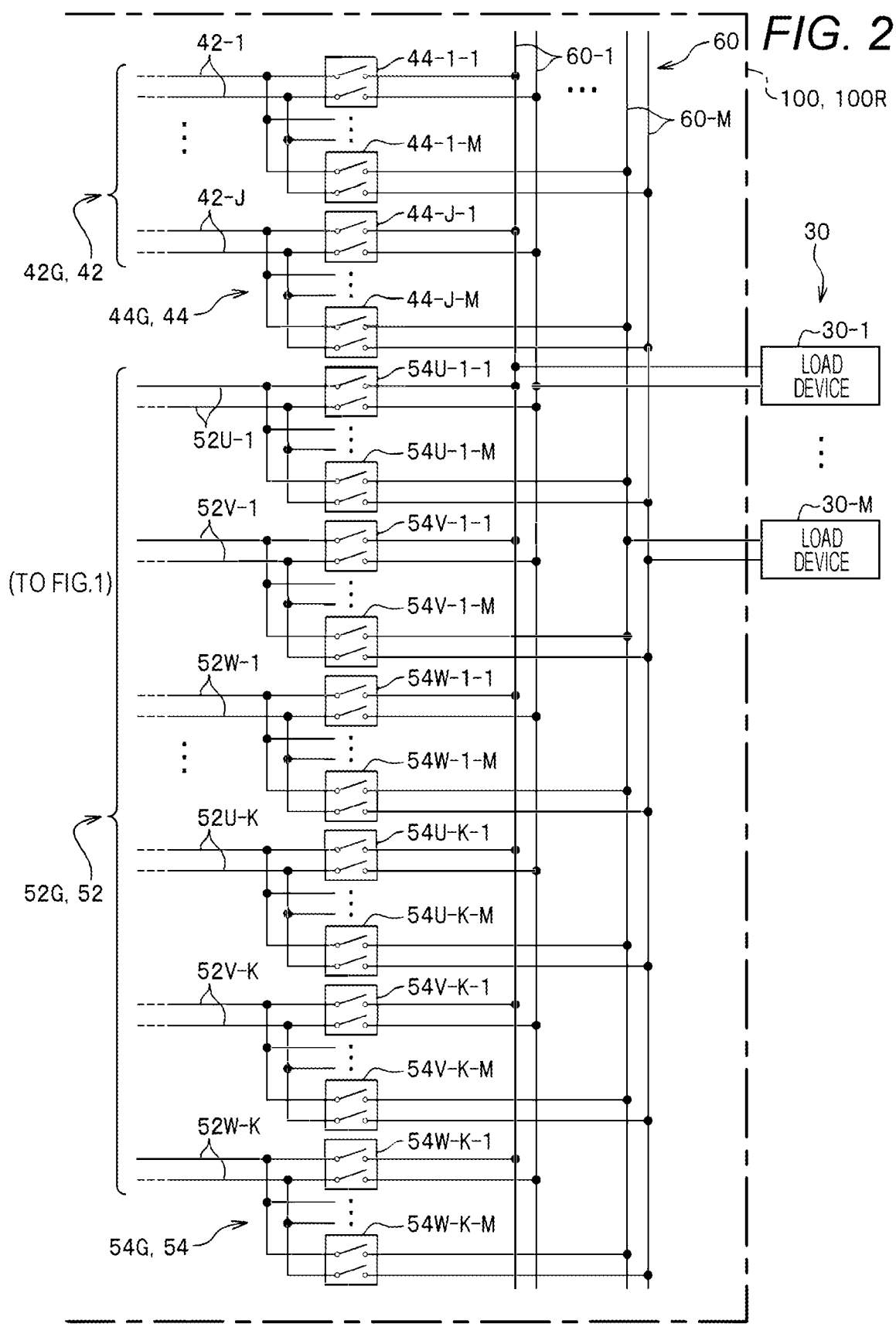
FIG. 2 is a block diagram of a rear stage section of the power conversion device according to the first embodiment.

FIG. 2 is a block diagram of a rear stage section 100R of the power conversion device 100.

In FIG. 2, the common line group 42G and the independent line group 52G are arranged in the same manner as described in FIG. 1. The power conversion device 100 is provided with M lines of DC buses 60-1 to 60-M, each of which is a pair of positive and negative buses. Each of these DC buses may be referred to as a "DC bus 60". M may be referred to as "the number of DC buses".

To the common line 42-p (where 1≤p≤J), M switches 44-p-1 to 44-p-M are connected, which switch connection relationships (on/off states) between the common line 42-p and the DC buses 60-1 to 60-M. In other words, to common lines 42-1 to 42-J that total up to J, M switches 44-1-1 to 44-1-M . . . M switches 44-J-1 to 44-J-M are connected, respectively (Hence the total number of connected switches is J×M). The switches connected to these common lines 42 may be collectively referred to as a "switch group 44G", and each switch of the switch group 44G may be referred to as a "switch 44 (common switch)".

To an independent line 52r-q (where r represents one of U, V, and W and 1≤q≤K), M switches 54r-q-1 to 54r-q-M are connected, which switch connection relationships (on/off states) between the independent line 52r-q and the DC buses 60-1 to 60-M. In other words, to independent lines 52U-1 to 52U-K, 52V-1 to 52V-K, and 52W-1 to 52W-K that total up to 3×K, M switches 54U-1-1 to 54U-1-M . . . M switches 54U-K-1 to 54U-K-M, M switches 54V-1-1 to 54V-1-M . . . M switches 54V-K-1 to 54V-K-M, and M switches 54W-1-1 to 54W-1-M . . . M switches 54W-K-1 to 54W-K-M are connected, respectively (Hence the total number of connected switches is 3×K×M).

The switches connected to these independent lines 52 may be collectively referred to as a "switch group 54G", and each switch of the switch group 54G may be referred to as a "switch 54 (independent switch)". The above switches 44 and 54 may be electromagnetic switches or switches that can be manually operated by an operator. To the DC buses 60-1 to 60-M, load devices (electric devices) 30-1 to 30-M can be connected respectively in one-to-one connection. Each of these load devices may be referred to as a "load device 30 (electric device)". It should be noted that the number of the load devices 30 may be smaller than M. In other words, the load devices 30 may be connected only to some of the DC buses 60.

Based on settings of the above switch groups 44G and 54G, the load devices 30-1 to 30-M are supplied with power from one of or a plurality of converter cells 40 and 50 belonging to the converter cell group 40G and/or the converter cell group 50G. In the example of FIG. 2, one converter cell 40, 50 supplies power to one load device 30 only and does not supply power simultaneously to a plurality of load devices 30. It should be noted, however, that a pattern of power supply by one converter cell 40 or 50 is not limited to the pattern in the example of FIG. 2. One converter cell 40, 50 may supply power simultaneously to a plurality of load devices 30.

<Configuration of Converter Cell>

Figure 3:
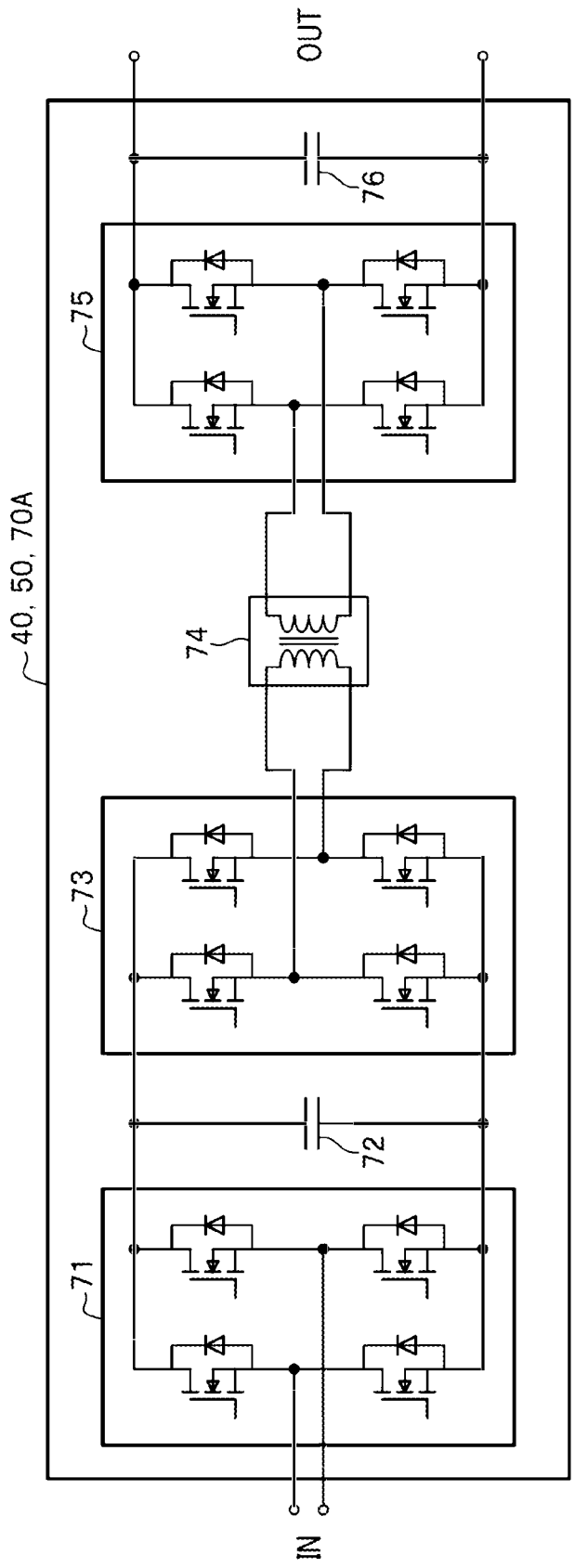
FIG. 3 is a block diagram of a converter cell.

FIG. 3 is a block diagram of a converter cell 70A. The converter cell 70A is an example of a device that can be used as the converter cells 40 and 50.

In FIG. 3, the converter cell 70A includes a single-phase AC/DC converter 71 (first power converter), a smoothing capacitor 72, a single-phase DC/AC converter 73 (first power converter), a high-frequency transformer 74, a single-phase AC/DC converter 75 (second power converter), and a smoothing capacitor 76.

The single-phase AC/DC converter 71 converts a single-phase AC voltage with a commercial frequency, the single-phase AC voltage being inputted from an input terminal IN, into a DC voltage, and supplies the DC voltage to the single-phase DC/AC converter 73 via the smoothing capacitor 72. The single-phase DC/AC converter 73 converts the DC voltage into a single-phase AC voltage with a high frequency and supplies the single-phase AC voltage to the single-phase AC/DC converter 75 via the high-frequency transformer 74. The high frequency mentioned here is, for example, a frequency of 100 Hz or higher. It is preferable that a frequency of 1 kHz or higher be adopted, and is more preferable that a frequency of 10 kHz or higher be adopted. The single-phase AC/DC converter 75 rectifies the single-phase AC voltage with the high-frequency, and outputs a DC voltage from an output terminal OUT via the smoothing capacitor 76.

Each of the single-phase AC/DC converters 71 and 75 and the single-phase DC/AC converter 73 has four switching elements (with no reference signs) connected in an H-bridge shape, and a diode (with no reference sign) connected in anti-parallel to the switching elements. As these switching elements, semiconductor switching elements, such as metal-oxide-semiconductor field-effect transistors (MOSFETs) and insulated gate bipolar transistors (IGBTs), can be used. Other types of semiconductor switching elements, however, may also be used as these switching elements.

Figure 4:
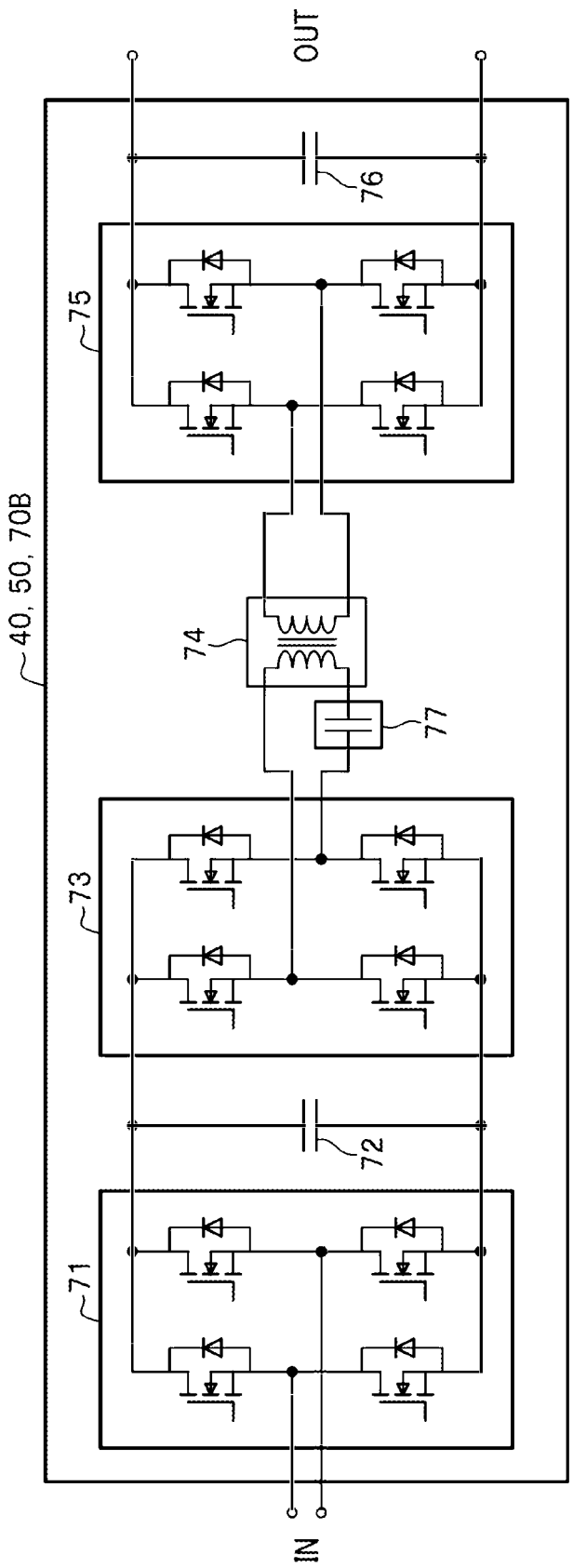
FIG. 4 is a block diagram of another converter cell.

FIG. 4 is a block diagram of a converter cell 70B. The converter cell 70B is another example of the device that can be used as the above converter cells 40 and 50.

In FIG. 4, the converter cell 70B is similarly in configuration to the converter cell 70A (see FIG. 3) but is in fact different from the converter cell 70A in that a capacitor 77 (first capacitor) is interposed in series between the single-phase DC/AC converter 73 and the high-frequency transformer 74. As a result of interposing the capacitor 77, the high-frequency transformer 74 and the capacitor 77 form a resonance circuit, which makes power transmission from the single-phase DC/AC converter 73 to the single-phase AC/DC converter 75 further efficient.

Figure 5:
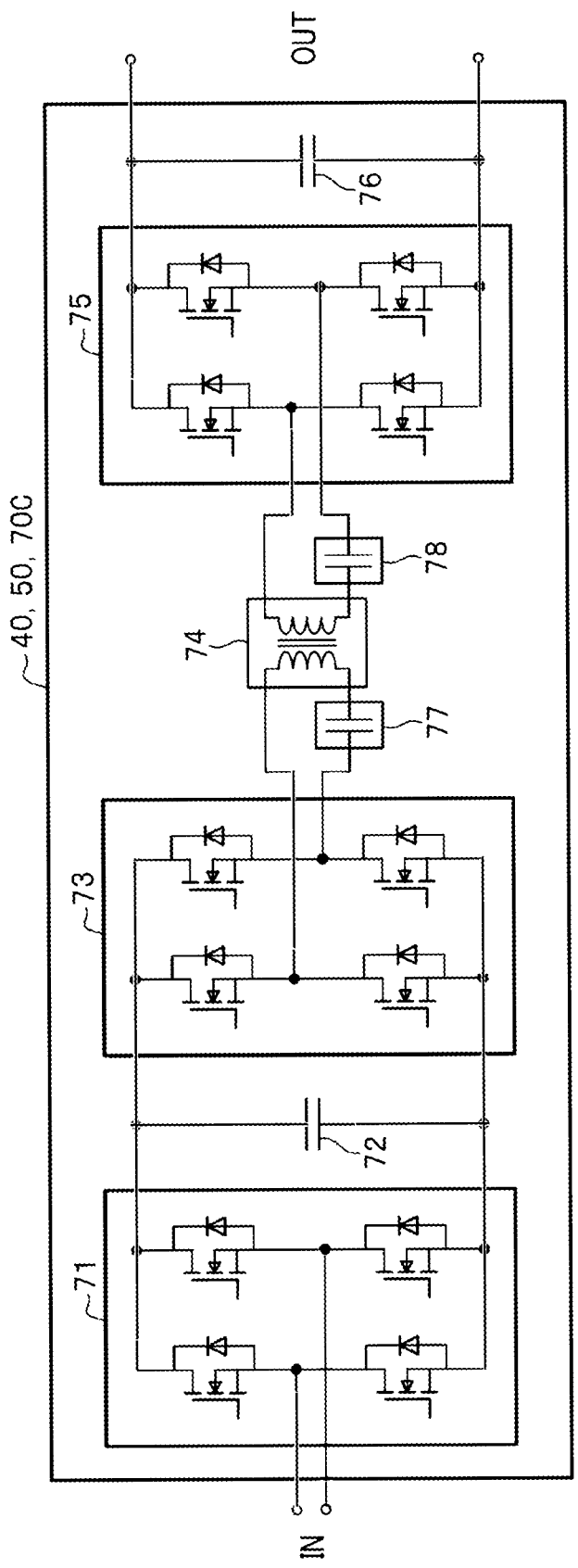
FIG. 5 is a block diagram of still another converter cell.

FIG. 5 is a block diagram of a converter cell 70C. The converter cell 70C is a still another example of the device that can be used as the converter cells 40 and 50.

In FIG. 5, the converter cell 70C is similarly in configuration to the converter cell 70B (see FIG. 4) but is in fact different from the converter cell 70B in that a capacitor 78 (second capacitor) is additionally interposed in series between the high-frequency transformer 74 and the single-phase AC/DC converter 75. In this manner, as a result of interposing the capacitors 77 and 78 on the primary side and the secondary side of the high-frequency transformer 74, respectively, the high-frequency transformer 74 and the capacitors 77 and 78 form a resonance circuit, which makes power transmission from the single-phase DC/AC converter 73 to the single-phase AC/DC converter 75 further efficient.

<Operation in First Embodiment>

Not all of the converter cells 40 and 50 shown in FIG. 1 are necessarily put in an on-state, and a required number of the converter cells 40 and 50 are put in the on-state, depending on the type and the number of load devices 30 actually connected, as the other converter cells 40 and 50 are put in an off-state. The "on-state" is a state in which DC power is supplied from the output terminal OUT to any one of the DC buses 60 (see FIG. 2), and the "off-state" is a state in which DC power is supplied to none of the DC buses 60.

The number of DC buses 60 (see FIG. 2) actually used is referred to as the number of DC buses used MA (where MA≤M). In a case where DC buses 60 and load devices 30 are connected to each other in one-to-one connection, the number of DC buses used MA is equal to the number of the load devices 30 actually connected to the DC buses. The number of converter cells 40 put in the on-state is referred to as the number of common cells used JA (where JA≤3×J), and the number of stages of converter cells 50 put in the on-state is referred to as the number of independent cells used KA (where KA≤3×K). Rated power per one converter cell 40, 50 is referred to as cell rated power PC. Power the load device 30 takes in from the DC bus 60 is referred to as load power PL (electric device information).

It is assumed, for example, that the number of load devices 30 is 3 and the number of DC buses used MA is 3 as well. It is further assumed that the load power PL is seven times the cell rated power PC. The operator divides the load power PL of any one load device 30 by "power three times the cell rated power PC" to calculates the quotient and the remainder of the division. This division in the above assumed case (PL=7×PC) gives the quotient "2" and the remainder "1".

The operator then allocates converter cells 40 of which the number of stages is equal to the quotient ("2" in the above case), to the load device 30 and allocates the converter cells 50 of which the number of cells is equal to the remainder ("1" in the above example), to the load device 30. The operator executes this operation for all load device 30.

Hence the above case, in which the three load devices 30 each have the equal load power PL, gives the number of common cells used JA=2×3×3=18 and the number of independent cells used KA=1×3=3. 18 converter cells 40 and 3 converter cells 50 are thus used actually, in which case the total number of converter cells 40 and 50 used amounts to 21.

If the cell rated power PC of the converter cells 40 and 50 actually used and the load power PL of the load device 30 are known, a ratio JA/KA between the number of common cells used JA and the number of independent cells used KA can be roughly estimated. It is preferable, therefore, that a ratio J/K between the common-cell number of stages J and the independent-cell number of stages K, which are indicated in FIG. 1, be set as a value close to the estimated ratio JA/KA. As a result of this setting, the power conversion device 100 can operate efficiently as the total number of the switches 44 and 54 is reduced as much as possible to reduce the cost of the power conversion device 100, and respective loads of converter cells connected in series can be brought closer to balanced loads.

Second Embodiment

A preferred second embodiment will then be described. In the following description, some components corresponding to components of the above first embodiment may be denoted by the same reference sings used in the first embodiment and omitted in further description.

Figure 6:
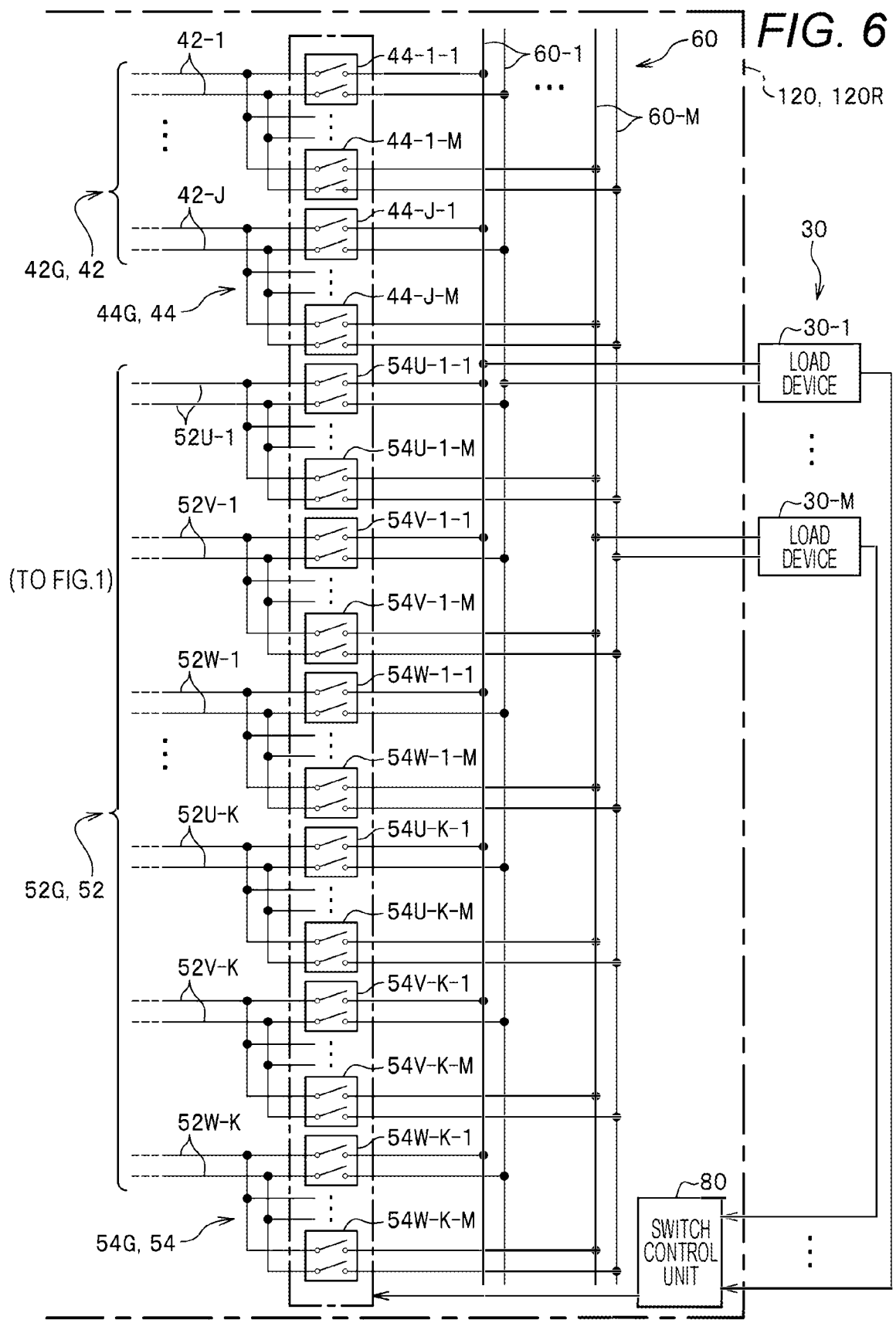
FIG. 6 is a block diagram of a rear stage section of a power conversion device according to a preferred second embodiment.

FIG. 6 is a block diagram of a rear stage section 120R of a power conversion device 120 according to a preferred second embodiment. It should be noted that the configuration of a front stage section of the power conversion device 100 is identical with the configuration of the front stage section 100F (see FIG. 1) according to the first embodiment.

The configuration of the rear stage section 120R shown in FIG. 6 is also similar to the configuration of the rear stage section 100R according to the first embodiment (see FIG. 2), but is in fact different from the configuration of the rear stage section 100R in the following points. In the rear stage section 120R of this embodiment, the switches 44 and 54 are all electromagnetic switches. The rear stage section 120R is provided with a switch control unit 80 that controls on/off-states of the switches 44 and 54. The switch control unit 80 receives load information, such as information on the load power PL, from the load device 30 and sets the on/off states of the switches 44 and 54 according to a result of load information analysis.

Figure 7:
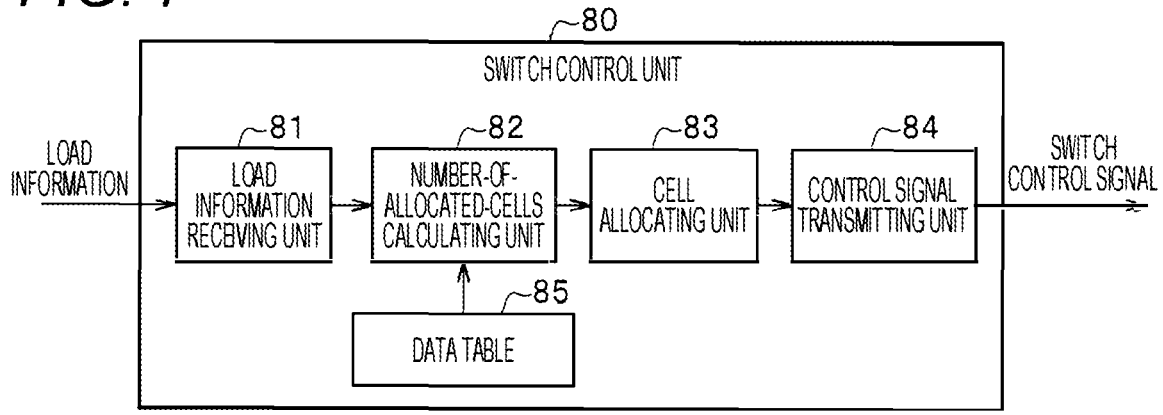
FIG. 7 is a block diagram of a switch control unit.

FIG. 7 is a block diagram of the switch control unit 80.

The switch control unit 80 includes hardware making up an ordinary computer, such as a central processing unit (CPU) a random access memory (RAM), a read only memory (ROM), and a solid state drive (SSD), and the SSD stores an operating system (OS), an application program, various data, and the like. The OS and the application program are loaded onto the RAM and are executed by the CPU.

FIG. 7 shows the inside of the switch control unit 80 where functions implemented by the application program or the like are depicted as functional blocks. The switch control unit 80 includes a load information receiving unit 81, a number-of-allocated-cells calculating unit 82, a cell allocating unit 83, a control signal transmitting unit 84, and a data table 85.

The load information receiving unit 81 receives load information, such as information on the load power PL, from each load device 30. The data table 85 stores information specifying a pattern of the load power PL that is assumed for each DC bus 60 and the number of converter cells that corresponds to each pattern. The number-of-allocated-cells calculating unit 82 calculates the number of converter cells to be allocated to each DC bus 60 (or each load device 30), according to received load information and the content of the data table 85. For example, the number-of-allocated-cells calculating unit 82 searches the data table 85 for a pattern closest to a pattern indicated by the inputted load information, and calculates the number of converter cells, based on the search result.

An example of a pattern of the load power PL, the pattern being stored in the data table 85, will be described. For example, it is assumed that three load devices 30 are connected to the DC bus 60, and the load power PL of each load device 30 is 7 times the cell rated power PC. In this example, the total number of converter cells 40 and 50 is 7×3=21. Because the number of DC buses used MA is "3", for example, seven converter cells are allocated to each of three DC buses 60-1 to 60-3.

In the case of such a load power pattern, therefore, the data table 85 stores "7" as data of the number of converter cells to be allocated to each DC bus 60. Also in the case of various patterns of the load power to each DC bus 103 that are different from the above pattern, the data table 85 stores data of the number of converter cells to be allocated to each DC bus 103.

It is, however, not always necessary to provide the data table 85. In a case where no data table 85 is provided, a number given by dividing the load power PL by the cell rated power PC and rounding up a decimal point may be determined to be the number of converter cells for the load device 30. The cell allocating unit 83 allocates converter cells 40 and 50 to each DC bus 60, based on the calculated number of converter cells. The control signal transmitting unit 84 transmits a switch control signal for setting the on/off-states of switches 44 and 54, to the switch groups 44G and 54G so that cell allocation determined by the cell allocating unit 83 is put into practice.

<Operation in Second Embodiment>

An operation executed in this embodiment will then be described.

Figure 8:
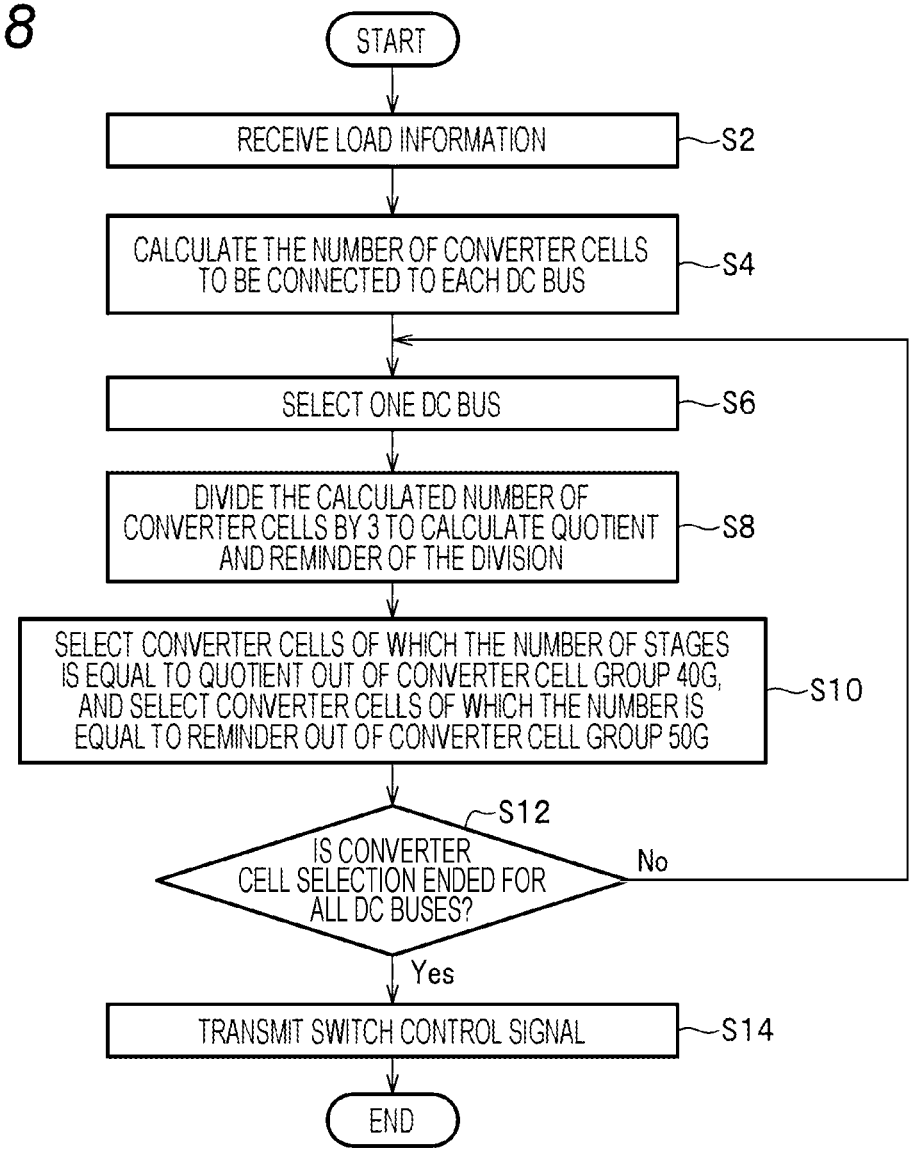
FIG. 8 is a flowchart of a cell allocation process routine.

FIG. 8 is a flowchart of a cell allocation process routine executed by the switch control unit 80.

In FIG. 8, when the process proceeds to step S2, the load information receiving unit 81 receives load information, such as information on each load power PL, from the load device 30 connected to each DC bus 60. Subsequently, when the process proceeds to step S4, the number-of-allocated-cells calculating unit 82 calculates the number of converter cells to be connected to each DC bus 60.

Subsequently, when the process proceeds to step S6, the cell allocating unit 83 selects one DC bus 60 to which the load device 30 is connected but converter cells 40 and 50 are not allocated yet. Subsequently, when the process proceeds to step S8, the cell allocating unit 83 divides the number of converter cells by "3" to calculate the "quotient" and the "remainder" of the division.

Subsequently, when the process proceeds to step S10, the cell allocating unit 83 selects converter cells 40 of which the number of stages is equal to the "quotient" (that is, converter cells 40 the number of which is equal to three times the "quotient") out of the converter cell group 40G, as converter cells to be connected to the selected DC bus 60. Further, at step S10, the cell allocating unit 83 selects converter cells 50 the number of which is equal to the "remainder" out of the converter cell group 50G, as converter cells 50 to be connected to the selected DC bus 60.

Subsequently, when the process proceeds to step S12, the cell allocating unit 83 determines whether selection of the converter cells 40 and 50 has been completed for all DC buses 60 to which the load devices 30 are connected. When "No" results at step S12, the process returns to step S6, from which steps S6 to S10 are repeated on another DC bus 60 to which converter cells 40 and 50 are not allocated yet.

When "Yes" results at step S12, on the other hand, the process proceeds to step S14. At a point of time at which the process has proceeded to step S14 in the above manner, the cell allocating unit 83 specifies the number of common cells used JA, which is the number of stages of converter cells 40 allocated to any one of the DC buses 60, and the number of independent cells used KA, which is the number of stages of converter cells 50 allocated to any one of the DC buses 60. Then, at step S14, the control signal transmitting unit 84 transmits a switch control signal to the switch groups 44G and 54G, the switch control signal putting cell allocation determined by the cell allocating unit 83 into practice. Following step S14, the process routine comes to an end. Thereafter, according to the cell allocation determined by the cell allocating unit 83, the converter cells 40 and 50 supply DC power to the corresponding load device 30 via the corresponding DC bus 60.

COMPARATIVE EXAMPLES

Comparative examples will then be described to clearly show the effects of the preferable embodiments.

Comparative Example #1

First, as a comparative example #1, an example in which the common-cell number of stages J, which is indicated in FIG. 1, is "0" will be discussed. In this comparative example #1, therefore, the independent-cell number of stages K is equal to the total number of stages N.

In the same manner as in the above specific example, it is assumed that the number of DC buses used MA (the number of load devices 30) is 3 and that the load power PL is 7 times the cell rated power PC. In this comparative example #1, seven converter cells 50 are allocated to each load device 30, and therefore the total number of converter cells 50 used is 7×3=21, which is the same number of converter cells 50 used in the above embodiment.

In the comparative example #1, however, the number of switches 54 to be included in the power conversion device 100 becomes enormous, which poses a problem that the power conversion device 100 becomes bulky and expensive.

Comparative Example #2

Next, as a comparative example #2, an example in which the independent-cell number of stages K, which is indicated in FIG. 1, is "0" will be discussed. In this comparative example #2, therefore, the common-cell number of stages J is equal to the total number of stages N.

In the same manner as in the above specific example, it is assumed that the number of DC buses used MA (the number of load devices 30) is 3 and that the load power PL is 7 times the cell rated power PC. In this comparative example #2, the number of converter cells 40 that can be allocated to each load device 30 is a multiple of "3". Since the multiple of "3" that is equal to or greater than PL/PC=7 is "9", the total number of converter cells 40 used is 9×3=27, which makes effective use of the converter cells 40 impossible.

In general, the converter cell 40 and a device equivalent thereto offer the highest efficiency when output power matches the cell rated power PC, and the efficiency drops as the output power becomes lower than the cell rated power PC. In this comparative example #2, the output power of each converter cell 40 is lower than the cell rated power PC, which creates another problem that the overall efficiency of the power conversion device 100 drops.

Effects of Embodiments

According to the above preferred embodiments, each of the power conversion devices 100 and 120 includes: three input lines 22U, 22V, and 22W to which a three-phase voltage is inputted; 3×N converter cells 40 and 50 having their respective input terminals IN connected in series or in parallel between each of the input lines 22U, 22V, and 22W and a neutral line 24; M lines of DC bus 60; and a plurality of switches 44 and 54 that set a state of connection between each of output terminals OUT of the 3×N converter cells 40 and 50 and each of the M lines of DC buses 60. The output terminals OUT of common converter cells (40) that are converter cells 40 of a number of stages J (where N>J) connected between each of the input lines 22U, 22V, and 22W and the neutral line 24 are connected to a common line 42 as the output terminals OUT of the other common converter cells (40) of two phases are connected to the common line 42 as well. The output terminals OUT of independent converter cells 50 that are converter cells 50 of a number of stages K (where K=N−J) connected between each of the input lines 22U, 22V, and 22W and the neutral line 24 are connected to an independent line 52 independent of the other independent converter cells 50 of two-phase. The plurality of switches 44 and 54 include a common switch (44) that switches a connection relationship between each of the common lines 42 and each of the DC bus 60, and an independent switch (54) that switches a connection relationship between each of the independent lines 52 and each of the DC buses 60. The power conversion device of this configuration can stably supply inputted power from the three-phase power source system 10, to a plurality of load devices and the like, and can be constructed by using a small-scale circuit.

It is more preferable that 3×N converter cells 40 and 50 have their respective input terminals IN connected in series as input terminals of the number of stages N between each of the input lines 22U, 22V, and 22W and the neutral line 24. This reduces a voltage applied to individual converter cells 40 and 50 and simplifies the configuration of the converter cells 40 and 50.

It is also more preferable that the power conversion device further include a switch control unit 80 that acquires electric device information (PL) on an electric device (30) connected to some or all of the M lines of DC buses 60 and that sets connection states of the switches 44 and 54, based on the acquired electric device information (PL). This allows automatically setting states of the switches 44 and 54, based on the electric device information (PL).

It is also more preferable that the switch control unit 80 further include a number-of-allocated-cells calculating unit 82 that calculates the number of converter cells 40 and 50 to be connected to each DC bus 60, based on the electric device information (PL). This allows automatically calculating the number of converter cells 40 and 50 to be connected to the DC bus 60, based on the electric device information (PL).

It is also more preferable that the number-of-allocated-cells calculating unit 82 have a function of determining the number of common cells used JA, which is the number of common converter cells (40) that supply power to any one of the DC buses 60, from a number equal to or smaller than 3×J, and a function of determining the number of independent cells used KA, which is the number of independent converter cells 50 that supply power to any one of the DC buses 60, from a number equal to or smaller than 3×K. This allows automatically setting the number of common cells used JA and the number of independent cells used KA.

It is also more preferable that each of the converter cells 40 and 50 include a high-frequency transformer 74, first power converters (71 and 73) connected to the primary side of the high-frequency transformer 74, and a second power converter (75) connected to the secondary side of the high-frequency transformer 74. This allows efficiently converting power while insulating the primary side from the secondary side.

It is also more preferable that each of the converter cells 40 and 50 further include a first capacitor (77) connected in series between the first power converters (71 and 73) and the high-frequency transformer 74. In this configuration, the first capacitor (77) and the high-frequency transformer 74 form a resonance circuit, which makes power transmission from the first power converters (71 and 73) to the second power converter (75) further efficient.

It is also more preferable that each of the converter cells 40 and 50 further include a second capacitor (78) connected in series between the second power converter (75) and the high-frequency transformer 74. In this configuration, the first capacitor (77), the second capacitor (78), and the high-frequency transformer 74 form a resonance circuit, which makes power transmission from the first power converters (71 and 73) to the second power converter (75) further efficient.

[Modification]

The present invention is not limited to the above embodiments and allows various modifications of the invention. The above embodiments have been described exemplarily for easy understanding of the present invention, and are not necessarily limited to an embodiment including all the constituent elements described above. Some constituent elements of a certain embodiment may be replaced with constituent elements of another embodiment, and a constituent element of another embodiment may be added to a constituent element of a certain embodiment. Some of constituent elements of each embodiment can be deleted therefrom or add to or replaced with constituent elements of another embodiment. A group of control lines and data lines considered to be necessary for description are illustrated in drawings, and all control lines and data lines the product needs are not necessarily illustrated. It is safe to assume that, actually, almost the entire constituent elements are interconnected. Possible modifications of the above embodiments are, for example, as follows.

(1) In each of the above embodiments, an example in which the load device 30 is used as the electric device connected to the DC bus 60 has been described. The electric device connected to the DC bus 60 is, however, not limited to the load device 30, and may be, for example, a power generator, such as a solar power generator or a wind power generator. In the second embodiment, such an electric device supplies load power or generated power to the switch control unit 80, as electric device information.

Figure 9:
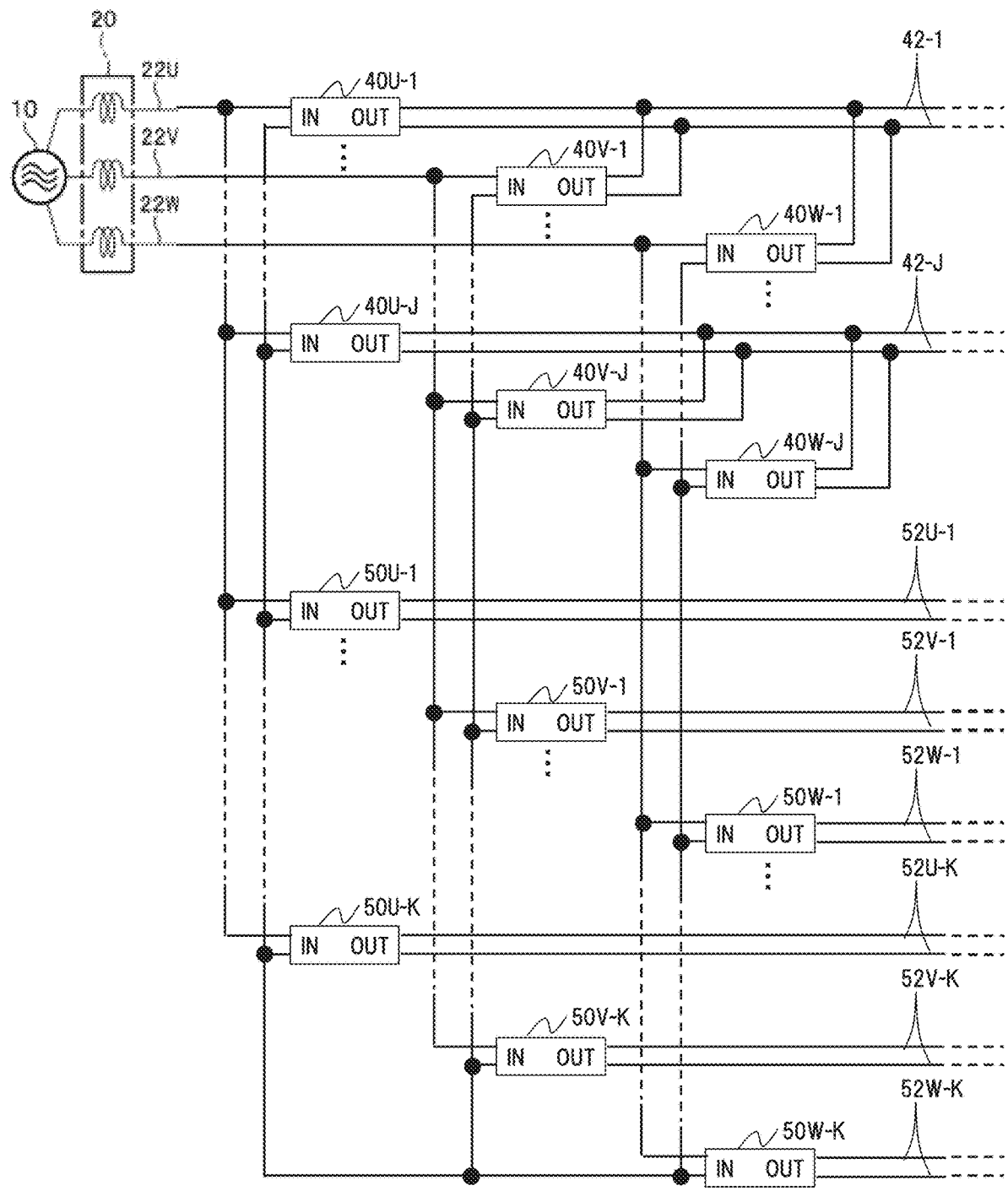
FIG. 9 is a block diagram of a front stage section of a power conversion device according to a second embodiment.

(2) In each of the above embodiments, the input terminals IN of the converter cells 40 and 50 are connected in series between the input lines 22U, 22V, and 22W and the neutral line 24. However, as illustrated in FIG. 9, the input terminals IN of the converter cells 40 and 50 may be connected in parallel between the input lines 22U, 22V, and 22W and the neutral line 24. A method of connecting the input terminals IN of the plurality of converter cells 40 may be a method by which a combination of series connection and parallel connection are adopted.

(3) The data table 85 (see FIG. 7) of the second embodiment may be placed in a cloud system or the like on a network (not illustrated), and may not be included in the switch control unit 80.

(4) Because the hardware configuration of the switch control unit 80 according to the second embodiment can be provided as an ordinary computer, the flowchart shown in FIG. 8 and programs for executing various processes described above may be stored in a storage medium or distributed through a transmission path.

(5) The process shown in FIG. 8 and other processes described above have been explained in the above embodiments as software-based processes using programs. Part or all of the processes, however, may be replaced with a hardware-based process using an application specific integrated circuit (ASIC) or a field programmable gate array (FPGA), or the like.

REFERENCE SIGNS LIST 22U, 22V, 22W input line
24 neutral line
30 load device (electric device)
40 converter cell (common converter cell)
42 common line
44 switch (common switch)
50 converter cell (independent converter cell)
52 Independent line
54 switch (independent switch)
60 DC bus
71 single-phase AC/DC converter (first power converter)
73 single-phase DC/AC converter (first power converter)
74 high-frequency transformer
75 single-phase AC/DC converter (second power converter)
77 capacitor (first capacitor)
78 capacitor (second capacitor)
80 switch control unit
82 number-of-allocated-cells calculating unit
100, 120 power conversion device
IN input terminal
JA number of common cells used
KA number of independent cells used
PL load power (electric device information)
OUT output terminal

The invention claimed is:

1. A power conversion device comprising:
three input lines to which a three-phase voltage is inputted;
3×N converter cells having their respective input terminals connected in series or in parallel between each of the input lines and a neutral line;
M lines of DC bus; and
a plurality of switches that set a state of connection between each of output terminals of the 3×N converter cells and each of the M lines of DC buses, wherein
the output terminals of common converter cells that are the converter cells of a number of stages J (where N>J and J≥1) connected between each of the input lines and the neutral line are connected to a common line as the output terminals of the other common converter cells of two phases are connected to the common line as well,
the output terminals of independent converter cells that are the converter cells of a number of stages K (where K=N−J and K≥1) connected between each of the input lines and the neutral line are connected to an independent line independent of the other independent converter cells of two-phase, and
the plurality of switches includes a common switch that switches a connection relationship between each of the common lines and each of the DC buses, and an independent switch that switches a connection relationship between each of the independent lines and each of the DC buses.

2. The power conversion device according to claim 1, wherein
the 3×N converter cells have the input terminals connected in series as input terminals of a number of stages N between each of the input lines and the neutral line.

3. The power conversion device according to claim 2, further comprising a switch control unit that acquires electric device information on an electric device connected to some or all of the M lines of DC buses and that sets connection states of the switches, based on the acquired electric device information.

4. The power conversion device according to claim 3, wherein
the switch control unit further includes a number-of-allocated-cells calculating unit that calculates a number of the converter cells to be connected to each of the DC buses, based on the electric device information.

5. The power conversion device according to claim 4, wherein
the number-of-allocated-cells calculating unit includes
a function of determining a number of common cells used which is a number of the common converter cells that supply power to any one of the DC buses, from a number equal to or smaller than 3×J, and
a function of determining a number of independent cells used which is a number of the independent converter cells that supply power to any one of the DC buses, from a number equal to or smaller than 3×K.

6. The power conversion device according to claim 1, wherein
the converter cell includes
a high-frequency transformer,
a first power converter connected to a primary side of the high-frequency transformer, and
a second power converter connected to a secondary side of the high-frequency transformer.

7. The power conversion device according to claim 6, wherein
the converter cell further includes a first capacitor connected in series between the first power converter and the high-frequency transformer.

8. The power conversion device according to claim 7, wherein
the converter cell further includes a second capacitor connected in series between the second power converter and the high-frequency transformer.

* * * * *